Patented July 31, 1951

2,562,369

UNITED STATES PATENT OFFICE 2,562,369

CONDENSATION OF SATURATED HYDROCARBONS WITH CHLOROOLEFINS

Louis Schmerling, Riverside, Ill., assignor to Universal Oil Products Company, Chicago, Ill., a corporation of Delaware No Drawing. Application June 29, 1950, Serial No. 171,236

16 Claims. (Cl. 260—648)

1

This application is a continuation-in-part of my copending application Serial No. 738,207, filed March 29, 1947, now abandoned.

This invention relates to the interaction of saturated hydrocarbons with chloroolefins in the presence of peroxy compound condensation catalysts. It is more specifically concerned with the preparation of chlorine-containing hydrocarbons by the condensation of polychloroolefins with saturated hydrocarbons containing more than two carbon atoms per molecule in the presence of organic peroxide condensation catalysts.

In a broad aspect, my invention relates to the condensation of polychloroolefins, particularly polychloromonoolefins in which each of the doubly bonded carbon atoms has at least one chlorine atom attached thereto, with saturated hydrocarbons containing more than two carbon atoms per molecule in the presence of a peroxy compound condensation catalyst. One molecule of the chloroolefin condenses with one molecule of the saturated hydrocarbon with the elimination or evolution of one molecule of hydrogen chloride. The resultant product is unsaturated.

In one embodiment my invention relates to a process which comprises reacting a saturated hydrocarbon containing more than two carbon atoms with a polychloroolefin at condensation conditions in the presence of a peroxy compound condensation catalyst.

In a more specific embodiment my invention relates to a process which comprises reacting a saturated hydrocarbon containing more than two carbon atoms with a polychloromonoolefin having at least one chlorine atom attached to each of the doubly bonded carbon atoms in the presence of a peroxy compound condensation catalyst at a temperature at least as high as the initial decomposition temperature of the catalyst and a pressure such that a substantial portion of the reactants are in the liquid phase.

In another specific embodiment my invention relates to a process which comprises reacting a saturated hydrocarbon containing more than two carbon atoms with a polychloromonoolefin, in which each of the doubly bonded carbon atoms has at least one chlorine atom attached thereto, in the presence of a peroxy compound condensation catalyst and water and at a temperature at least as high as the initial decomposition temperature of the catalyst.

The saturated hydrocarbons that are utilizable in the process of this invention comprise paraffins containing more than two carbon atoms per molecule such as propane, normal butane, isobutane, normal pentane, isopentane, isooctane and the like, as well as cycloparaffins such as cyclopentane, cyclohexane, methylcyclopentane and the like. Cycloparaffins containing less than five carbon atoms in the ring generally are not utilizable in my process, since they are less stable than cyclopentanes and cyclohexanes and act more like olefins.

The chloroolefins that may be reacted with saturated hydrocarbons in the presence of peroxy compound condensation catalysts in accordance with my invention comprise chloroolefins containing more than one chlorine atom per molecule. A preferred species comprises polychloromonoolefins in which both of the doubly bonded carbon atoms has at least one chlorine atom attached thereto. The chloroolefin may be either of the open chain or cyclic type. Examples of suitable chloroolefins are 1,2-dichloroethylene, trichloroethylene, tetrachloroethylene, 1,2-dichloro-1-propene, 1,2-dichlorocyclohexene, and 1,1,2-trichloro-1-propene. It is essential that the chloroolefin contain at least two chlorine atoms per molecule, since monochloroolefins do not give a condensation reaction of the type herein described. Similarly, polyhaloolefins other than polychoroolefins, do not give reactions of the type herein described. Polychloroolefins such as 3,3,3-trifluoro-1,2-dichloro-1-propene that contain one or more fluorine atoms attached to one or more saturated carbon atoms, i. e., carbon atoms bonded by univalent bonds to four atoms, may be used in my process since the fluorine atoms in such compounds do not noticeably affect the reactivity of the chlorine atoms.

The catalysts that may be used in the present process are those which are capable of forming free radicals under the reaction conditions. These include peroxy compounds, by which is meant any compound capable of inducing the condensation of saturated hydrocarbons with chloroolefins and which contains the bivalent radical -O-O-. Examples of such compounds are the alkali metal and ammonium persulfates, perborates, and percarbonates; peracetic acid, persuccinic acid, dimethyl peroxide, diethyl peroxide, methyl ethyl peroxide, di-tertiary-butyl peroxide, di-propyl peroxide, acetyl benzoyl peroxide, acetyl peroxide, propionyl peroxide, butyryl peroxide, lauroyl peroxide, benzoyl peroxide, tetralin peroxide, urea peroxide, tertiary butyl perbenzoate, tertiary butyl hydroperoxide, and methylcyclohexyl hydroperoxide. The organic peroxy compounds constitute a preferred class of catalysts for use in this invention. Mixtures of peroxy compound catalysts may be employed. Only catalytic amounts (i. e., less than stoichiometric amounts) need be used in my process. Among the other free radical forming catalysts which may be used are metal alkyls such as lead tetraethyl and diazonium compounds.

Hydrogen chloride is evolved in the condensation reactions herein disclosed. In cases where it is desirable to avoid radical changes in pH during the course of the reaction, small amounts of materials which have a buffering action on the pH may be included in the condensation mixture. Since the condensations can be carried out satisfactorily in either an acid or an alkaline medium, many types of buffering agents can be used. For example, an alkaline pH can be maintained by the use of such buffers as borax, disodium phosphate, sodium carbonate, ammonium carbonate, sodium acetate, etc. For a pH below 7, such materials as acetic acid, propionic acid, and other organic acids, monosodium phosphate, sodium hydroxide+potassium acid phthalate, and the like may be used.

It is known that metal halides of the Friedel-Crafts type catalyze the condensation of isoparaffins with haloolefins, but a comparison of the results obtained with those catalysts and the results obtained with the peroxy compound catalysts herein disclosed, shows that there are marked differences. For example, in the condensation of isobutane with symmetrical dichloroethylene, the use of Friedel-Crafts metal halide catalyst yields a saturated chloride, namely 1,1,2-trichloro-3,3-dimethylbutane, as well as hexane, a saturated hydrocarbon. On the other hand, the use of a peroxy compound catalyst yields 1-chloro-3,3-dimethyl-1-butene, an unsaturated chloride, and hydrogen chloride. Again the condensation of cis or trans dichloroethylene with isobutane gives nearly equivalent yields with peroxides; whereas with Friedel-Crafts metal halides, the trans compound gives much lower yields than the cis. Finally, and probably most important, the use of peroxides enables propane and normal paraffins to be condensed with haloolefins. The interaction of propane and normal paraffins with haloolefins is not catalyzed by Friedel-Crafts metal halides.

The process of this invention may be carried out in batch operation by placing a quantity of the saturated hydrocarbon and the catalyst in a reactor equipped with a mixing device, adding the chloroolefin, heating to a reaction temperature while mixing the contents of the reactor, cooling after a suitable period of time, and recovering the condensation products.

The preferred method of operation is of the continuous type. In this method of operation the saturated hydrocarbon, the chloroolefin, and the catalyst are continuously charged to a reactor maintained at suitable conditions of temperature and pressure. The reactor may be an unpacked vessel or coil, or it may contain an adsorbent packing material such as fire brick, alumina, dehydrated bauxite, and the like. The condensation products are separated from the reactor effluent and the unconverted material may be recycled to the reaction zone.

Instead of separately adding the peroxide catalyst to the reaction zone, I have found that it frequently is more desirable and economical to form a catalyst in situ in the saturated hydrocarbon and then charge the resulting solution to the reaction zone together with the chloroolefin. Formation of the peroxide in the saturated hydrocarbon may be accomplished by auto-oxidation, i. e., by heating the hydrocarbon while air is bubbled through it, preferably in the presence of a trace of peroxide formed in a previous auto-oxidation. Alternatively, the air may be passed through the hydrocarbon in the presence of an oxidation catalyst such as manganese stearate.

In the continuous methods of carrying out my process, the catalyst preferably is added continuously to the reaction zone, but if desired, it may be added intermittently.

In yet another mode of operation, the reactants and the peroxide are heated with water, with or without the addition of emulsifying agents. Contrary to what might be expected, the presence of water does not have a harmful effect on the reaction. Instead, the yield of desired product is actually increased. The reactions in the presence of water may be carried out in either batch or continuous types of operation.

The temperatures employed in the process of this invention should be at least as high as the initial decomposition temperature of the peroxy compound used as the catalyst. In the case of tertiary butyl perbenzoate, for example, the decomposition temperature is rather sharply defined and is approximately 115° C. On the other hand, benzoyl peroxide decomposes over a relatively wide temperature range. Usually little advantage is gained if the reaction is conducted at a temperature more than about 150° C. higher than the decomposition temperature of the catalyst.

Saturated hydrocarbons condense with chloroolefins in the presence of peroxy compound catalysts when the reactants are in the vapor phase as well as when they are in the liquid phase. However, liquid phase operation is preferred, consequently, the pressure at which the reaction is conducted will be chosen accordingly.

The reaction times may be within the range of from slightly less than one minute to several hours. However, contact times of at least ten minutes usually are preferred.

The following examples are given to illustrate my invention but they are not introduced with the intention of unduly limiting the generally broad scope of said invention.

EXAMPLE I

Various saturated hydrocarbons were condensed with chloroethylenes in the presence of peroxides by placing the reactants in glass liners in a rotating autoclave of 850 cc. capacity. The reactants were heated at the designated temperatures for four hours after which the product was cooled and recovered. The operating conditions and results are shown in the following table.

hexyl)-ethylene, boiling at 71–72° C. at 2.5 mm. pressure (about 222–224° C. at atmospheric pressure). The yield of dichloride was 34% of the theoretical based on the trichloroethylene charged. The presence of water thus resulted in a 50% increase in yield (cf. expt. No. 9).

Table 1
CONDENSATION OF SATURATED HYDROCARBONS WITH CHLOROETHYLENES IN THE PRESENCE OF PEROXIDES

| Expt. No. | 1 | 2 | 3 | 4 | 5 | 6 | 7 | 8 | 9 |
|---|---|---|---|---|---|---|---|---|---|
| Chloroolefin | | ClCH=CHCl | | | $Cl_2C=CHCl$ | | $C_2Cl_4$ | $C_2H_3Cl_3$ | $C_2HCl_3$ |
| Hydrocarbon | $iC_4H_{10}$ | | $nC_5H_{12}$ | $C_3H_8$ | $iC_4H_{10}$ | $C_3H_8$ | $iC_4H_{10}$ | $C_7H_{14}$ | $C_7H_{14}$ |
| Reactants, g.: | | | | | | | | | |
| Chloroolefin | [1] 60 | [2] 60 | [3] 67 | 65 | 60 | 60 | 51 | [1] 60 | 41 |
| Hydrocarbon | 78 | 170 | 105 | 110 | 112 | 115 | 100 | 75 | 50 |
| Peroxide | [4] 5 | [3] 8 | [3] 4 | [3] 8 | [3] 8 | [3] 8 | [3] 4 | [4] 5 | [4] 3 |
| Temperature, °C | 115 | 140 | 140 | 140 | 140 | 140 | 140 | 115 | 115 |
| Duration, Hrs | 4 | 4 | 4 | 4 | 4 | 4 | 4 | 4 | 4 |
| Pressure, Atm.: | | | | | | | | | |
| Initial, $N_2$ | 50 | 50 | 50 | 50 | 50 | 50 | 50 | 50 | 50 |
| Maximum | 83 | 97 | 75 | 117 | 100 | 118 | 112 | 78 | 70 |
| Final | 52 | 52 | 49 | 56 | 52 | 57 | 50 | 50 | 50 |
| Total Liquid Prod., g | 96 | 66 | 166 | 65 | 87 | 68 | 56 | 132 | 90 |
| Chief Product: | | | | | | | | | |
| Formula | [7] | [7] | [8] | [9] | [10] | [11] | [12] | [13] | [14] |
| Ave. B. P., °C | 105 | 106 | 135 | 82 | 135 | 119 | 151 | 192 | 222 |
| Yield, Moles | 0.13 | 0.22 | 0.05 | 0.07 | 0.21 | 0.14 | 0.09 | 0.12 | 0.07 |
| Yield, Per cent of Theoretical | 21 | 35 | 7 | 10 | 46 | 31 | 30 | 19 | 23 |

[1] Trans-Dichloroethylene.
[2] Cis-Dichloroethylene.
[3] Mixture of cis- and trans-dichloroethylene.
[4] Tertiary-Butyl perbenzoate.
[5] Di-tertiary-butyl peroxide.
[6] Methylcyclohexane.
[7] $C_4H_7$—CH=CHCl.
[8] $C_5H_{11}$—CH=CHCl.
[9] $C_3H_7$—CH=CHCl.
[10] $C_4H_9$—CH=CCl$_2$.
[11] $C_3H_7$—CH=CCl$_2$.
[12] $C_4H_7$—CCl=CCl$_2$.
[13] $C_7H_{13}$—CH=CHCl.
[14] $C_7H_{13}$—CH=CCl$_2$.

It will be noted that straight chain, branched chain, and cyclic paraffins were all readily condensed with the chloroolefins. Of particular interest is the fact that normal pentane and propane were reacted with chloroethylenes.

EXAMPLE II

An experiment similar to expt. No. 9 of Example I was carried out in order to show the effect of water. A mixture of 40 g. of trichloroethylene, 50 g. of methylcyclohexane, 3 g. of tertiary-butyl perbenzoate and 100 g. of water was placed in a glass liner and heated in a rotating autoclave at 115° C. for four hours under an initial nitrogen pressure of 50 atm. The product consisted of 190 g. of clear, amber-colored upper layer and a water-white aqueous layer. The upper layer was separated, dried over potassium carbonate and distilled. There was obtained 20 g. (0.10 mole) of 1,1-dichloro-2-(methylcyclo-

EXAMPLE III

A number of attempts were made to condense tribromoethylene with various saturated hydrocarbons under a variety of operating conditions. Also, two experiments were made in which it was attempted to condense dibromoethylene with saturated hydrocarbons. These latter two experiments were made in order to obviate any objection that steric factors might be involved in the reactions with the tribromoethylene. The operating conditions and results are shown in the following table:

Table 2

| Expt. No. | 11 | 12 | 13 | 14 | 15 | 16 | 17 |
|---|---|---|---|---|---|---|---|
| Bromoolefin | | | Tribromoethylene | Propane | Propane | 1,2-Dibromoethylene | Propane. |
| Hydrocarbon | Methyl-Cyclohexane. | n-Heptane | Isobutane | Propane | Propane | Methyl-Cyclohexane. | Propane. |
| Peroxide | Benzoyl | Peroxide | Di-t-Butyl Peroxide. | | t-Butyl Perbenzoate. | Benzoyl Peroxide. | t-Butyl-Perbenzoate. |
| Reactants, g.: | | | | | | | |
| Bromoolefins | 55 | 66 | 50 | 43 | 43 | 22 | 38 |
| Hydrocarbon | 51 | 25 | 50 | 105 | 100 | 23 | 70 |
| Peroxide | 5 | 5 | 6 | 6 | 6 | 3 | 6 |
| Temperature, °C | 94 | 97 | 140 | 140 | 115 | 101 | 115 |
| Duration, Hours | 7 | 9 | 4 | 4 | 4 | 10 | 4 |
| Pressure, Atm.: | | | | | | | |
| Initial | 1 | 1 | 50 | 50 | 50 | 1 | 50 |
| Maximum | 1 | 1 | 85 | 103 | 101 | 1 | 95 |
| Final at Room temperature | 1 | 1 | 50 | 50 | 50 | 1 | 50 |
| Products, g.: | | | | | | | |
| Total Liquid | 100 | 96 | [3] 49 [4] | [3] 31 | [3] 44 | 46 | 38 |
| Higher Boiling [4] | [5] 5 | [6] 1 | [7] 1 | [7] 2 | [8] 4 | [6] 2 | [6] 3 |

[1] Consists of dark amber liquid and black deposit on liner wall.
[2] Dark amber liquid and black coating (crinkled and separated from wall of liner; insoluble in acetone and benzene).
[3] Dark amber liquid.
[4] Product remaining in distillation flask, after distillation of major portion of unreacted hydrocarbon and polybromoethylene.
[5] Dark amber liquid bottoms from distillation under 20 mm. pressure; includes tribromoethylene.
[6] Product not washed before distillation. Includes benzoic acid.
[7] Dark liquid and black solid.
[8] Dark crystals (benzoic acid).

It can be seen that substantially no reaction took place in any of the experiments, even though some of the experiments were conducted at atmospheric pressure under reflux conditions and the remainder were conducted in bombs under superatmospheric pressure.

Other experiments have shown that iodoolefins react in substantially the same manner as the bromoolefins. On the other hand, fluoroolefins react with saturated hydrocarbons in the presence of peroxide, but they do not give the same type of products as do chloroolefins. When polyfluoroolefins react with paraffins or with cycloparaffins no hydrogen fluoride is evolved and the resultant product is saturated. In addition, more than 1 molecule of the fluoroolefin combines with 1 molecule of the saturated hydrocarbon, i. e., simple 1 to 1 condensation is not obtained as a major reaction product as in the case of chloroolefins and saturated hydrocarbons. Therefore, it can be seen that the reaction that takes place with polychloroolefins and saturated hydrocarbons in the presence of peroxy compound condensation catalysts is unique.

EXAMPLE IV

A mixture of 51 g. of 1,2-dichloro-3,3,3-trifluoro-1-propene, 145 g. of isobutane and 8 g. of di-tertiary-butyl peroxide was heated at 130–140° C. in a glass liner in a rotating autoclave as described in Example I. Distillation of the reaction product yielded 25 g. (43% of the theoretical) of a trifluorochloroheptene, apparently 1,1,1 - trifluoro-2-chloro-4,4-dimethyl-2-heptene, boiling at 56–57° C. at 121 mm. pressure and having a refractive index, $n_D^{20}$, of 1.3832.

I claim as my invention:

1. A process for producing an unsaturated chlorinated hydrocarbon which comprises condensing, in the presence of a peroxy compound catalyst and at a reaction temperature at least as high as the initial decomposition temperature of said catalyst, one molecular proportion of a saturated hydrocarbon containing more than two carbon atoms and one molecular proportion of a polychloroolefin having at least one chlorine atom attached to each of the doubly bonded carbon atoms, said reaction temperature being sufficient to split off one molecular proportion of hydrogen chloride from the reaction mixture.

2. A process for producing an unsaturated chlorinated hydrocarbon which comprises condensing, in the presence of an organic peroxide catalyst and at a reaction temperature at least as high as the initial decomposition temperature of said catalyst, one molecular proportion of a saturated hydrocarbon containing more than two carbon atoms and one molecular proportion of a polychloroolefin having at least one chlorine atom attached to each of the doubly bonded carbon atoms, said reaction temperature being sufficient to split off one molecular proportion of hydrogen chloride from the reaction mixture.

3. A process for producing an unsaturated chlorinated hydrocarbon which comprises condensing, in the presence of a peroxy compound catalyst and at a reaction temperature at least as high as the initial decomposition temperature of said catalyst, one molecular proportion of a saturated hydrocarbon containing more than two carbon atoms and one molecular proportion of a polychloromonoolefin having at least one chlorine atom attached to each of the doubly bonded carbon atoms, said reaction temperature being sufficient to split off one molecular proportion of hydrogen chloride from the reaction mixture.

4. A process which comprises reacting one molecular proportion of a saturated hydrocarbon containing more than two carbon atoms with one molecular proportion of a polychloroolefin having at least one chlorine atom attached to each of the doubly bonded carbon atoms in the presence of a peroxy compound condensation catalyst at a condensation temperature at least as high as the initial decomposition temperature of the catalyst and a pressure such that a substantial portion of the reactants is in the liquid phase, said condensation temperature being sufficient to split off one molecular proportion of hydrogen chloride from the reaction mixture.

5. A process which comprises reacting one molecular proportion of a saturated hydrocarbon containing more than two carbon atoms with one molecular proportion of a polychloromonoolefin having at least one chlorine atom attached to each of the doubly bonded carbon atoms in the presence of an organic peroxide condensation catalyst at a condensation temperature at least as high as the initial decomposition temperature of the catalyst and a pressure such that a substantial portion of the reactants is in the liquid phase, said condensation temperature being sufficient to split off one molecular proportion of hydrogen chloride from the reaction mixture.

6. A process which comprises reacting one molecular proportion of a saturated hydrocarbon containing more than two carbon atoms with one molecular proportion of a polychloroethylene in which each of the doubly bonded carbon atoms has at least one chlorine atom attached thereto in the presence of a peroxy compound condensation catalyst and at a condensation temperature at least as high as the initial decomposition temperature of the catalyst, and a pressure such that a substantial portion of the reactants is in the liquid phase, said condensation temperature being sufficient to split off one molecular proportion of hydrogen chloride from the reaction mixture.

7. A process which comprises reacting one molecular proportion of a cycloparaffin having at least five carbon atoms in the ring with one molecular proportion of a polychloroethylene having at least one chlorine atom attached to each of the doubly bonded carbon atoms with a polychloroethylene having at least one chlorine atom attached to each of the doubly bonded carbon atoms in the presence of a peroxy compound condensation catalyst at a condensation temperature at least as high as the initial decomposition temperature of the catalyst and a pressure such that a substantial portion of the reactants is in the liquid phase, said condensation temperature being sufficient to split off one molecular proportion of hydrogen chloride from the reaction mixture.

8. A process which comprises reacting one molecular proportion of a cycloparaffin having at least five carbon atoms in the ring with one molecular proportion of a polychloroethylene having at least one chlorine atom attached to each of the doubly bonded carbon atoms in the presence of an organic peroxide condensation catalyst at a condensation temperature at least as high as the initial decomposition temperature of the catalyst and a pressure such that a substantial portion of the reactants is in the liquid phase, said condensation temperature being sufficient to split off one molecular proportion of hydrogen chloride from the reaction mixture.

9. A process which comprises reacting one molecular proportion of a paraffin containing more than two carbon atoms with one molecular proportion of a polychloroethylene having at least one chlorine atom attached to each of the doubly bonded carbon atoms in the presence of a peroxy compound condensation catalyst at a condensation temperature at least as high as the initial decomposition temperature of the catalyst and a pressure such that a substantial portion of the reactants is in the liquid phase, said condensation temperature being sufficient to split off one molecular proportion of hydrogen chloride from the reaction mixture.

10. A process which comprises reacting one molecular proportion of a straight-chain paraffin containing more than two carbon atoms with one molecular proportion of a polychloroethylene having at least one chlorine atom attached to each of the doubly bonded carbon atoms in the presence of a peroxy compound condensation catalyst at a condensation temperature at least as high as the initial decomposition temperature of the catalyst and a pressure such that a substantial portion of the reactants is in the liquid phase, said condensation temperature being sufficient to split off one molecular proportion of hydrogen chloride from the reaction mixture.

11. A process which comprises reacting one molecular proportion of an isoparaffin with one molecular proportion of a polychloroethylene having at least one chlorine atom attached to each of the doubly bonded carbon atoms in the presence of a peroxy compound condensation catalyst at a condensation temperature at least as high as the initial decomposition temperature of the catalyst and a pressure such that a substantial portion of the reactants is in the liquid phase, said condensation temperature being sufficient to split off one molecular proportion of hydrogen chloride from the reaction mixture.

12. A process which comprises reacting one molecular proportion of a paraffin containing more than two carbon atoms with one molecular proportion of a polychloroethylene having at least one chlorine atom attached to each of the doubly bonded carbon atoms in the presence of an organic peroxide condensation catalyst at a condensation temperature at least as high as the initial decomposition temperature of the catalyst and a pressure such that a substantial portion of the reactants is in the liquid phase, said condensation temperature being sufficient to split off one molecular proportion of hydrogen chloride from the reaction mixture.

13. A process which comprises reacting one molecular proportion of isobutane with one molecular proportion of a polychloroethylene having at least one chlorine atom attached to each of the doubly bonded carbon atoms in the presence of a peroxy compound condensation catalyst at a condensation temperature at least as high as the decomposition temperature of the catalyst and a pressure such that a substantial portion of the reactants is in the liquid phase, said condensation temperature being sufficient to split off one molecular proportion of hydrogen chloride from the reaction mixture.

14. A process which comprises reacting one molecular proportion of isobutane with one molecular proportion of trichloroethylene in the presence of a peroxy compound condensation catalyst at a condensation temperature at least as high as the decomposition temperature of the catalyst, said condensation temperature being sufficient to split off one molecular proportion of hydrogen chloride from the reaction mixture.

15. A process which comprises reacting one molecular proportion of a saturated hydrocarbon containing more than two carbon atoms with one molecular proportion of a polychloromonoolefin, in which each of the doubly bonded carbon atoms has at least one chlorine atom attached thereto, in the presence of a peroxy compound condensation catalyst and water and at a condensation temperature at least as high as the initial decomposition temperature of the catalyst, said condensation temperature being sufficient to split off one molecular proportion of hydrogen chloride from the reaction mixture.

16. A process which comprises reacting one molecular proportion of a saturated hydrocarbon containing more than two carbon atoms with one molecular proportion of a polychloromonoolefin, in which each of the doubly bonded carbon atoms has at least one chlorine atom attached thereto, in the presence of an organic peroxide condensation catalyst and water and at a condensation temperature at least as high as the initial decomposition temperature of said catalyst, said condensation temperature being sufficient to split off one molecular proportion of hydrogen chloride from the reaction mixture.

LOUIS SCHMERLING.

REFERENCES CITED

The following references are of record in the file of this patent:

UNITED STATES PATENTS

| Number | Name | Date |
| --- | --- | --- |
| 2,411,159 | Hanford | Nov. 19, 1946 |
| 2,440,800 | Hanford et al. | May 4, 1948 |
| 2,449,360 | Austin | Sept. 14, 1948 |